United States Patent
Brown

(10) Patent No.: US 8,764,891 B1
(45) Date of Patent: Jul. 1, 2014

(54) HEADLINER EDGE TREATMENT

(71) Applicant: GM Global Technology Operations LLC, Detroit, MI (US)

(72) Inventor: David L. Brown, Whtie Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/737,319

(22) Filed: Jan. 9, 2013

(51) Int. Cl.
*B60R 13/02* (2006.01)

(52) U.S. Cl.
CPC ......... *B60R 13/0212* (2013.01); *B60R 13/0231* (2013.01)
USPC ....................................... 96/214; 296/216.07

(58) Field of Classification Search
CPC ............ B60R 13/0212; B60R 13/2025; B60R 13/1231; B60R 21/04; B60R 2013/02; B60R 2021/04; B60R 2021/0442
USPC ................................ 296/214, 216.06–216.08
See application file for complete search history.

(56) References Cited

U.S. PATENT DOCUMENTS

| | | | |
|---|---|---|---|
| 5,108,147 A * | 4/1992 | Grimm et al. | 296/214 |
| 7,036,876 B2 * | 5/2006 | Senoo et al. | 296/214 |
| 7,147,276 B2 | 12/2006 | Pfeffer et al. | |
| 7,673,932 B2 | 3/2010 | Dykman et al. | |
| 7,726,728 B2 | 6/2010 | Arellano et al. | |
| 8,002,340 B2 * | 8/2011 | Lee | 296/214 |
| 2005/0231006 A1 | 10/2005 | Pfeffer et al. | |
| 2011/0133522 A1 | 6/2011 | Kring et al. | |
| 2011/0274921 A1 | 11/2011 | Li et al. | |

FOREIGN PATENT DOCUMENTS

DE    102005008678 A1    8/2006

* cited by examiner

*Primary Examiner* — Dennis H Pedder
(74) *Attorney, Agent, or Firm* — Quinn Law Group, PLLC

(57) ABSTRACT

A headliner for a vehicle roof includes a substrate and a reinforcement trim member attached to the substrate. The substrate has a planar edge characterized by lack of folding. The reinforcement trim member has a body and an attachment feature extending from the body. The attachment feature mates the headliner to the vehicle roof. The reinforcement trim member has a tip, which extends from the body, and a slot receptacle defined by the body. The slot receptacle of the reinforcement trim member receives the planar edge of the substrate to facilitate mating of the substrate to the reinforcement trim member. The headliner also includes a cover stock member, which covers the substrate and continuously wraps from the substrate around at least the tip the of reinforcement trim member.

8 Claims, 2 Drawing Sheets

HEADLINER EDGE TREATMENT

TECHNICAL FIELD

This disclosure relates to headliners for the interior portion of the roof of vehicles.

BACKGROUND

Headliners are attached or adhered to the interior portions of vehicle roofs. The headliner may span all or a portion of the roof and may include both decorative and functional elements, such as appearance cloth to improve aesthetics or soft foam to protect occupants from scraping against metal on the underside of the roof.

SUMMARY

A headliner is provided for a vehicle roof. The headliner includes a substrate and a reinforcement trim member attached to the substrate. The substrate has a planar edge that is characterized by lack of folding.

The reinforcement trim member has a body and an attachment feature extending from the body. The attachment feature is configured to mate the headliner to the vehicle roof. The reinforcement trim member also has a tip, which extends from the body, and a slot receptacle defined by the body.

The slot receptacle of the reinforcement trim member receives the planar edge of the substrate to facilitate mating of the substrate and the reinforcement trim member. The headliner also includes a cover stock member. The cover stock member covers the substrate and continuously wraps from the substrate around at least the tip the of reinforcement trim member.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
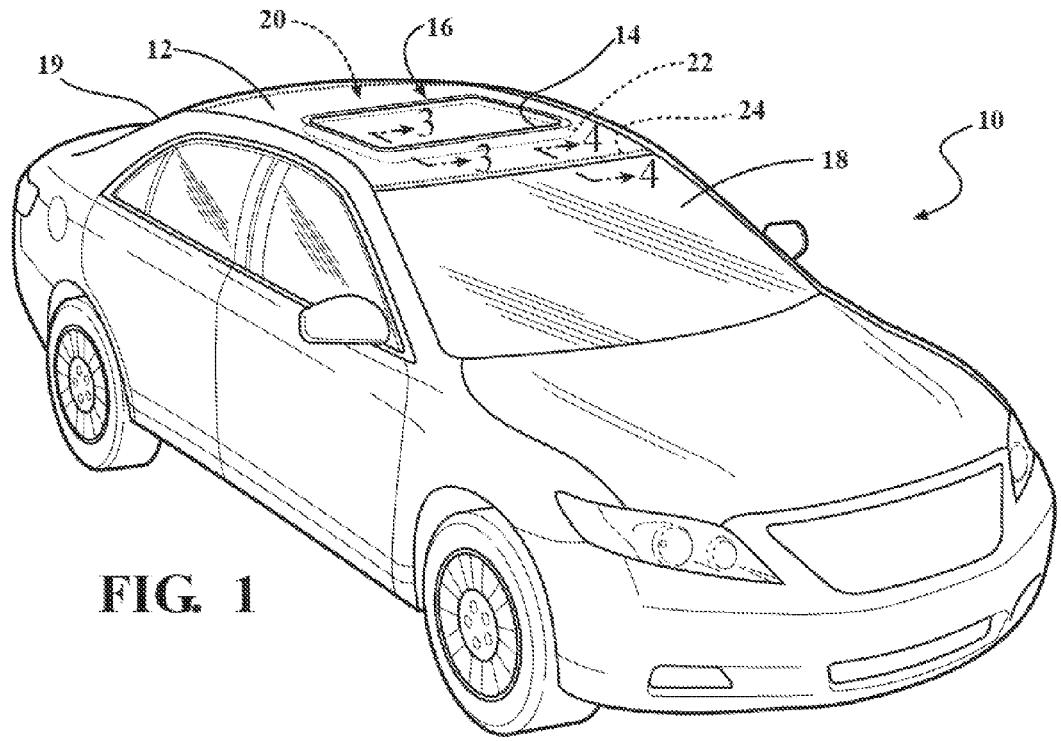
FIG. 1 is a schematic isometric view of a vehicle with a moonroof opening in a roof.

Referring to the drawings, like reference numbers correspond to like or similar components wherever possible throughout the several figures. FIG. 1 shows a vehicle 10, which is highly schematic but is illustrative of any type of automobile or other vehicle. A roof 12 generally covers the passenger compartment (not separately numbered) in which passengers or occupants of the vehicle 10 ride.

The roof 12 includes a moonroof opening 14. For purposes of this description, the terms sunroof and moonroof are used interchangeably, such that the moonroof opening 14 may alternatively be referred to as a sunroof opening. A moonroof assembly 16 fills the moonroof opening 14 and some of the adjacent structure of the roof 12. The moonroof assembly 16 facilities sliding, tilting, or other movement of a glass or opaque panel (not separately numbered) that selectively covers the moonroof opening 14.

The roof 12 is bounded by a windshield or windscreen 18 at a forward portion of the vehicle 10, relative to the direction of travel. Similarly, the roof 12 generally terminates at a similar window or windscreen 19 at a rearward potion of the vehicle 10. Although the windscreen 18 and the windscreen 19 may be different in production vehicles, this description focuses only on the windscreen 18 facing the forward direction, as the functions relative to the roof 12 are substantially similar.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

Elements hidden from view by the roof 12 are shown in dashed or phantom lines in FIG. 1, but are also illustrated in subsequent figures. A headliner 20 sits below the roof 12 and includes components providing a functional and an aesthetic barrier between the roof 12 and the passenger compartment. The headliner 20 includes multiple components and may also be referred to as a headliner assembly.

The headliner 20 includes a first reinforcement trim member 22, which at least partially defines the moonroof opening 14 and provides for functional and aesthetic transition between the headliner 12 and the moonroof assembly 16. Similarly, a second reinforcement trim member 24 abuts the windscreen 18 and facilitates aesthetic and function transition between the headliner 12 and the windscreen 18. Furthermore, interfaces between other components and the headliner 20 may have similar trim members, including, without limitation: backlights, quarter windows, or any other edge abutting the headliner 20.

Figure 2:
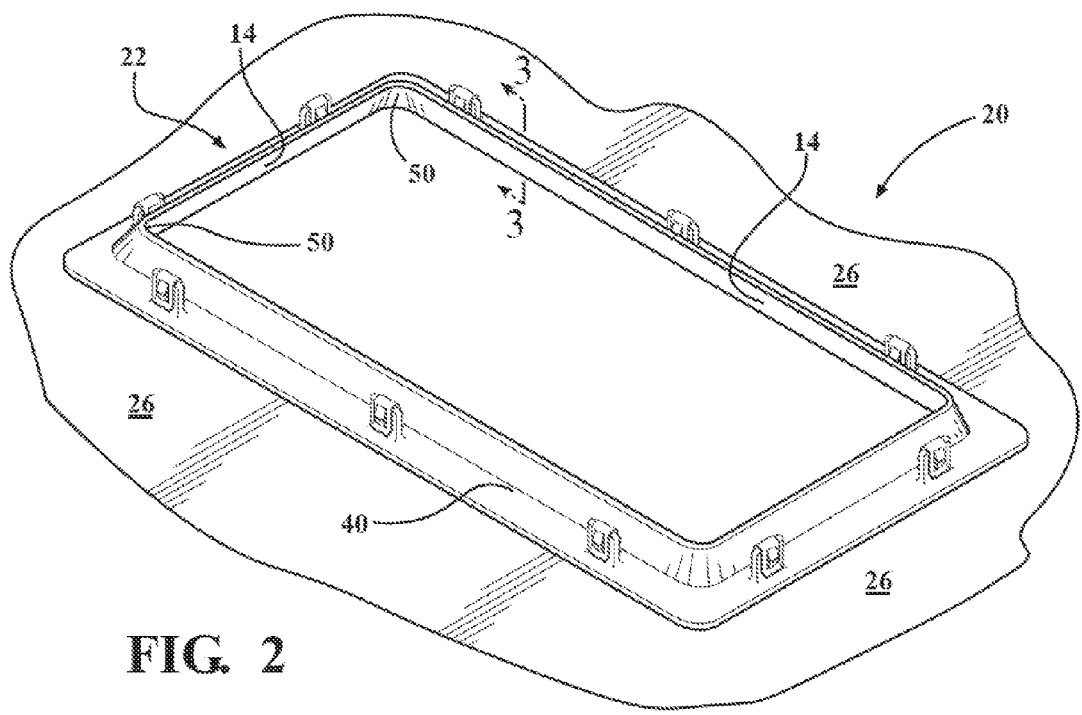
FIG. 2 is a schematic isometric view of a headliner and a reinforcement trim member defining the moonroof opening, and is shown with the roof removed from view.
Figure 3:
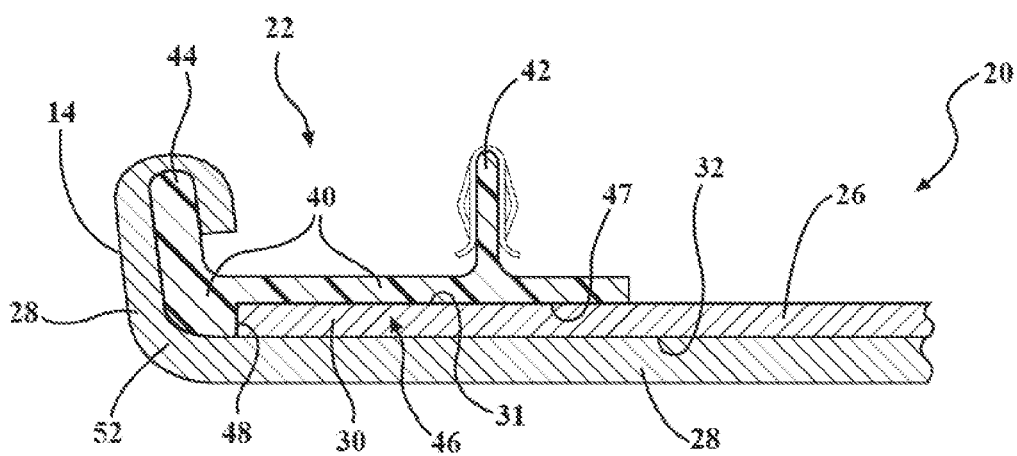
FIG. 3 is a schematic cross section taken along a line 3-3 of FIG. 1 with the roof structure removed from view, and illustrating elements of the headliner adjacent to the moonroof opening.

Referring now to FIG. 2 and to FIG. 3, and with continued reference to FIG. 1, there are shown two views of the headliner 20 with the roof 12 removed from view. FIG. 2 shows a schematic isometric view of the headliner 20 and the first reinforcement trim member 22, which is at the intersection between the roof 12 and the moonroof opening 14. FIG. 2 is illustrate without the roof 12 shown and is rotated by approximately ninety degrees relative to the view of FIG. 1. FIG. 3 shows a cross-sectional view taken along a line 3-3 of FIG. 1 (with the roof 12 structure removed) or FIG. 2. Note that FIG.

3 is highly schematic and may be illustrative of other configurations or other areas of the headliner 20.

As shown in both FIG. 2 and FIG. 3, the headliner 20 includes a substrate 26, which is attached to or mated with the first reinforcement trim member 22. The headliner 20 further includes a cover stock 28 covering the substrate 26. The cover stock 28 wraps substantially continuously from the substrate 26 around the first reinforcement trim member 22. Only a portion of the substrate 26 and the cover stock 28 are shown, but the substrate 26 and the cover stock 28 both span substantially the entire headliner 20.

The substrate 26 is dimensionally stable and may be formed from materials such as hard foam, plastic, wood, or composites. The cover stock 28 may be formed by bonding a textile sheet or fabric to a soft, flexible foam sheet to give the headliner 20 a soft padded feel, or the cover stock 28 may be a single material which is both flexible and has an aesthetically pleasing tactile surface. The cover stock 28 is wrapped, pulled, and adhered over the headliner 20. As shown in FIG. 3, the cover stock 28 is compressible and flexible, such that the cover stock 28 may be bent or pulled around tight corners and may have variable thickness depending upon the assembly process.

The substrate 26 may have less than ten (10) degrees of curvature at the first reinforcement trim member 22. The substrate 26 is minimally formed, may be referred to as an unfolded substrate 26, and is capable of being die-cut or water jet cut to form the mating surfaces for the first reinforcement trim member 22.

The substrate 26 has a first planar edge 30, to which the first reinforcement trim member 22 is attached. The first planar edge 30 is characterized by lack of folding and the substrate 26 may be referred to as an unfolded substrate.

The substrate 26 includes a top planar surface 31 and a bottom planar surface 32 on the first planar edge 30. The bottom planar surface 32 is substantially parallel to the top planar surface 31, such that the substrate 26 has substantially constant thickness adjacent to the first reinforcement trim member 22.

The first reinforcement trim member 22 defines the edges of the headliner 20, as opposed to the substrate 26 being formed to define the moonroof opening 14 and the portions adjacent the windscreen 16. The first reinforcement trim member 22 also defines wrapping edges or surfaces for the cover stock 28.

As shown in FIG. 3, the first reinforcement trim member 22 includes several defined portions or elements, including a body 40. An attachment feature 42 extends away from the body 40 and is configured to mate the first reinforcement trim member 22, and therefore the headliner 20, to the roof 12. The attachment feature 42 shown extends substantially straight upward relative to the substrate 26, but may also incorporate an angle, if attachment to the roof 12 so requires.

The first reinforcement trim member 22 also includes a tip 44 extending from the body 40. In the configuration shown in FIG. 3, the tip 44 extends generally upward and inward toward the moonroof opening 14.

The body 40 of the first reinforcement trim member 22 defines a slot receptacle 46. The slot receptacle 46 receives the first planar edge 30 of the substrate 26 and provides surface area for bonding between the substrate 26 and the reinforcement trim member 22.

The slot receptacle 46 of the first reinforcement trim member 22 includes a planar mating surface 47 that is complementary with the top planar surface 31 of the first planar edge 30 and is substantially parallel thereto. A butt edge 48 of the first reinforcement trim member 22 defines a portion of the slot receptacle 46. The first reinforcement trim member 22 may be pressed onto the first planar edge 30 such that, with the addition of an adhesive, a strong bond may be formed between the top planar surface 31 of the substrate 26 and the planar mating surface 47 of the first reinforcement trim member 22.

The butt edge 48 is substantially perpendicular to the planar mating surface 47 and is substantially equal in length to the thickness of the substrate 26, such that the butt edge 48 terminates substantially coincident with the bottom planar surface 32 of the substrate 26. Therefore, the body 40 is substantially continuous with the bottom planar surface 32 of the substrate 26 and there is a continuous surface about which the cover stock 28 may be wrapped or pulled.

As shown in FIGS. 1-3, substantially all of the curvature of the edge the headliner 20 contacting or abutting the moonroof opening 14 is formed by the first reinforcement trim member 22, as opposed to being formed in the substrate 26. Because the substrate 26 has limited formability, it generally may be bent only about large radii without fracturing. For example, the substrate 26 may not be able to be formed with less than a fifty-five (55) millimeter radius.

However, the headliner 20 shown may be formed with significantly smaller corners and bends, because first planar edge 30 of the substrate 26 is substantially unformed. For example, as best viewed in FIG. 2, one or more corners 50 of the reinforcement trim member 22 may have a radius of less than ten (10) millimeters. Similarly, as shown in FIG. 3, a wrapping curve 52 of the reinforcement trim member 22 may have a radius of less than ten, or even five (5), millimeters. While these edges, corners, or curves need not necessarily be as tight as the configuration of the headliner 20 shown, the ability of the reinforcement trim member 22 to have tight corners—that are not constrained by formability of the substrate 26—allows more flexibility in the design of the headliner 20.

Figure 4:
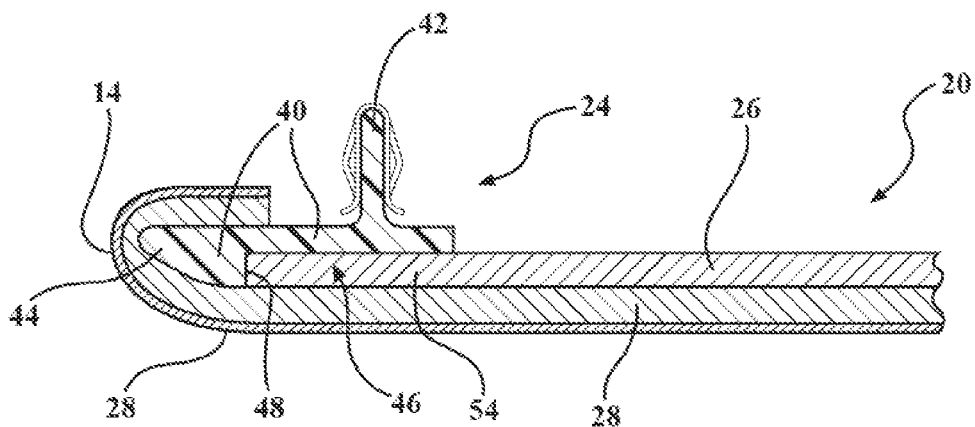
FIG. 4 is a schematic cross section taken along a line 4-4 of FIG. 1 with the roof structure removed from view, and illustrating elements of the headliner adjacent to a windscreen.

Referring now to FIG. 4, there is shown a cross-sectional view of the headliner 20 taken generally along a line 4-4 of FIG. 1. The portion of the headliner 20 shown in FIG. 4 generally abuts the windscreen 18, but may also abut other structure. In the view of FIG. 4, structures of the roof 12 have been removed from view. The second reinforcement trim member 24 facilitates the transition between the headliner 20 and the windscreen 18.

The substrate 26 extends between the first reinforcement trim member 22 and the second reinforcement trim member 24. A second planar edge 54 is defined at the exterior edge of substrate 26 adjacent to the windscreen 18 and the second reinforcement trim member 24 is attached to the second planar edge 54.

Similar to the first reinforcement trim member 22, the second reinforcement trim member 24 includes a body 40 and an attachment feature 42 extending from the body 40. The attachment feature 42 is configured to mate the headliner 20 to the roof 12.

A tip 44 extends from the body 40. However, in the second reinforcement trim member 24, the tip 44 is generally perpendicular to the attachment feature 42. A slot receptacle 46 is defined by the body 40, and receives the second planar edge 54 of the substrate 26.

The cover stock 28 extends between the first reinforcement trim member 22 and the second reinforcement trim member 24 and wraps continuously from the substrate 26 around at least the tip 44 of the second reinforcement trim member 24. As shown in FIG. 4, substantially all of the curvature of the edge contacting or abutting the windscreen 18 is formed by the second reinforcement trim member 24, as opposed to forming the curvature in the substrate 26.

Figure 5:
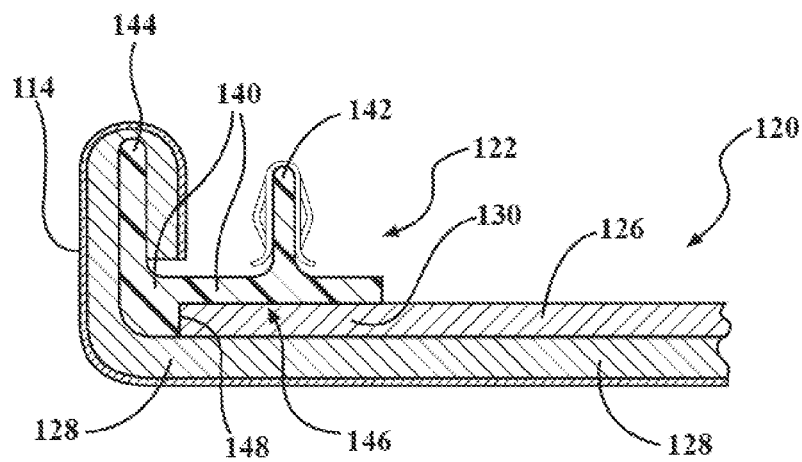
FIG. 5 is a schematic cross section taken along a line similar to the line 3-3, but illustrating an alternative configuration of the reinforcement trim member shown in FIG. 1.

Referring now to FIG. 5, there is shown a cross-sectional view of an alternative configuration of a headliner 120 having a reinforcement trim member 122. The view is taken along a line similar to the line 3-3 shown in FIG. 1. The reinforcement trim member 122 defines a moonroof opening 114.

The headliner 120 includes a substrate 126, which is attached to or mated with the reinforcement trim member 122. The headliner 120 further includes a cover stock 128 covering the substrate 126. The cover stock 128 wraps substantially continuously from the substrate 126 around the reinforcement trim member 122. Only a portion of the substrate 126 and the cover stock 128 are shown, but the substrate 126 and the cover stock 128 both span substantially the entire headliner 120. As shown in FIG. 5, the cover stock 128 is compressible and flexible, such that the cover stock 128 may be bent or pulled around tight corners and may have variable thickness depending upon the assembly process.

The substrate 126 may have less than ten (10) degrees of curvature at the reinforcement trim member 122 and is minimally formed, such that the substrate 126 is capable of being die-cut or water jet cut to form the mating surfaces for the reinforcement trim member 122.

The substrate 126 is attached to the reinforcement trim member 122 at a first planar edge 130. The first planar edge 130 is characterized by lack of folding and the substrate 126 may be referred to as an unfolded substrate. The substrate 126 has substantially constant thickness adjacent to the reinforcement trim member 122.

The reinforcement trim member 122 defines the edges of the headliner 120, as opposed to the substrate 126 being formed to define the moonroof opening 114. The reinforcement trim member 122 also defines wrapping edges or surfaces for the cover stock 128.

As shown in FIG. 5, the reinforcement trim member 122 similarly includes several defined portions or elements, including a body 140 and an attachment feature 142 extending away from the body 140. The attachment feature 142 is configured to mate the reinforcement trim member 122, and therefore the headliner 120, to the roof. The attachment feature 142 shown extends substantially straight upward relative to the substrate 126, but may also incorporate an angle, if attachment to the roof so requires.

The reinforcement trim member 122 also includes a tip 144 extending from the body 140. In the configuration shown in FIG. 5, the tip 144 extends generally substantially straight upward, such that the tip 144 extends parallel to the attachment feature.

The body 140 of the reinforcement trim member 122 defines a slot receptacle 146. Part of the slot receptacle includes a butt edge 148 defined by the reinforcement trim member 122. The slot receptacle 146 receives the first planar edge 130 of the substrate 126 and provides surface area for bonding between the substrate 126 and the reinforcement trim member 122. In the configuration shown in FIG. 5, both the attachment feature 142 and the tip 144 are substantially opposite the slot receptacle 146 relative to the body 140.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A headliner for a vehicle roof, the headliner comprising:
a substrate having a planar edge, wherein the planar edge is characterized by lack of folding;
a reinforcement trim member attached to the substrate, having:
a body,
an attachment feature extending from the body and configured to mate the headliner to the vehicle roof,
a tip extending from the body, and
a slot receptacle defined by the body, wherein the slot receptacle receives the planar edge of the substrate; and
a cover stock member covering the substrate and continuously wrapping around at least the tip the of reinforcement trim member.

2. The headliner of claim 1, further comprising:
a first planar surface formed on the planar edge of the substrate, and a second planar surface formed on the planar edge of the substrate and substantially parallel to first planar surface, wherein the second planar surface is offset from the first planar surface by a substrate thickness; and
a planar mating surface formed on the reinforcement trim member, wherein the planar mating surface defines a portion of the slot receptacle, and is configured to mate with the first planar surface of the substrate, and
a butt edge formed on the reinforcement trim member, wherein the butt edges defines a portion of the slot receptacle, and is substantially perpendicular to the planar mating surface and is substantially equal in length to the substrate thickness, such that the butt edge terminates substantially coincident with the second planar surface of the substrate.

3. The headliner of claim 2, wherein the slot receptacle is substantially opposite the attachment feature relative to the body.

4. The headliner of claim 3, wherein the tip of the reinforcement trim member is substantially parallel to the attachment member.

5. The headliner of claim 3, wherein the tip of the reinforcement trim member is substantially perpendicular to the attachment member.

6. A headliner for a vehicle roof having a moonroof opening, the headliner comprising:
a substrate spanning substantially the entire vehicle roof and having a first planar edge, wherein the first planar edge is characterized by lack of folding;
a first reinforcement trim member attached to the first planar edge of the substrate, wherein the first reinforcement trim member defines the moonroof opening and includes:
a body,
an attachment feature extending from the body and configured to mate the headliner to the vehicle roof,
a tip extending from the body, and
a slot receptacle defined by the body, wherein the slot receptacle receives the first planar edge of the substrate; and
a cover stock member covering the substrate and wrapping continuously from the substrate around at least the tip the of reinforcement trim member.

7. The headliner of claim 6, wherein the vehicle further includes a windscreen, further comprising:
a second planar edge defined by the substrate adjacent to the windscreen;

a second reinforcement trim member attached to the second planar edge of the substrate, wherein the second reinforcement trim member defines an exterior edge directly adjacent to the windscreen, wherein the second reinforcement trim member includes:
  a body,
  an attachment feature extending from the body and configured to mate the headliner to the vehicle roof,
  a tip extending from the body, and
  a slot receptacle defined by the body, wherein the slot receptacle receives the first planar edge of the substrate; and
wherein the cover stock member wraps continuously from the substrate around at least the tip of the second reinforcement trim member.

8. The headliner of claim 7, wherein the first reinforcement trim member, further includes:
  a butt edge that defines a portion of the slot receptacle, wherein the butt edge is substantially perpendicular to the first planar edge of the substrate and is substantially equal in length to a substrate thickness, such that the butt edge terminates substantially coincident with the substrate.

* * * * *